United States Patent
Ukai et al.

(10) Patent No.: US 8,420,973 B2
(45) Date of Patent: Apr. 16, 2013

(54) POWER-SUPPLY CONTROL DEVICE FOR ELECTRICAL DISCHARGE MACHINING APPARATUS

(75) Inventors: Hiroshi Ukai, Chiyoda-ku (JP);
Kazunari Morita, Chiyoda-ku (JP);
Shiro Sasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1650 days.

(21) Appl. No.: 11/884,000

(22) PCT Filed: Oct. 20, 2006

(86) PCT No.: PCT/JP2006/020968
§ 371 (c)(1),
(2), (4) Date: Aug. 9, 2007

(87) PCT Pub. No.: WO2008/047451
PCT Pub. Date: Apr. 24, 2008

(65) Prior Publication Data
US 2010/0147805 A1    Jun. 17, 2010

(51) Int. Cl.
*B23H 1/02* (2006.01)
(52) U.S. Cl.
USPC ................................. 219/69.13; 219/69.18
(58) Field of Classification Search .............. 219/69.13, 219/69.18
See application file for complete search history.

(56) References Cited

U.S. PATENT DOCUMENTS

| | | | | |
|---|---|---|---|---|
| 3,697,719 A | * | 10/1972 | Verner et al. ............... | 219/69.13 |
| 3,705,286 A | * | 12/1972 | Kondo et al. ............... | 219/69.13 |
| 3,975,607 A | * | 8/1976 | Ullmann et al. ........... | 219/69.13 |
| 3,996,445 A | * | 12/1976 | Wohlabaugh ............... | 219/69.13 |
| 3,997,753 A | * | 12/1976 | Inoue .......................... | 219/69.13 |
| 3,999,028 A | * | 12/1976 | Saito et al. .................. | 219/69.13 |
| 4,361,745 A | * | 11/1982 | Rupert et al. ............... | 219/69.13 |
| 4,370,536 A | * | 1/1983 | Kruth .......................... | 219/69.18 |
| 4,602,142 A | * | 7/1986 | Itoh ............................. | 219/69.13 |

(Continued)

FOREIGN PATENT DOCUMENTS

| | | |
|---|---|---|
| CH | 662074 A5 | 9/1987 |
| DE | 69014093 T2 | 3/1995 |

(Continued)

OTHER PUBLICATIONS

Machine translation of Japan Patent No. 8-323,544, Nov. 2011.*

(Continued)

*Primary Examiner* — Geoffrey S Evans
(74) *Attorney, Agent, or Firm* — Sughrue Mion, PLLC

(57) ABSTRACT

A power-supply control device includes a high-frequency component detecting unit, a machining voltage level detecting device, a no-load time detecting device, and a pulse control device. The high-frequency component detecting unit detects a high-frequency component of discharge voltage at a machining gap. The machining voltage level detecting device detects a discharge voltage level at the machining gap. The no-load time detecting device detects delay time of discharge of the discharge voltage at the machining gap. The high-frequency component is compared with a reference value to obtain a first comparison result. The discharge voltage level is compared with a reference level to obtain a second comparison result. The pulse control device controls pulse off time based on the first comparison result and the detected delay time, and cuts off a discharge pulse based on the second comparison result.

11 Claims, 14 Drawing Sheets

U.S. PATENT DOCUMENTS

| | | | | |
|---|---|---|---|---|
| 4,673,791 A | * | 6/1987 | Konno et al. | 219/69.13 |
| 4,728,764 A | * | 3/1988 | Matsumoto et al. | 219/69.13 |
| 4,800,248 A | * | 1/1989 | Futamura et al. | 219/69.18 |
| 5,182,474 A | * | 1/1993 | Kaneko | 219/69.18 |
| 5,496,984 A | | 3/1996 | Goto et al. | |
| 6,208,150 B1 | * | 3/2001 | Akamatsu | 219/69.18 |

FOREIGN PATENT DOCUMENTS

| | | | |
|---|---|---|---|
| DE | 19529186 A1 | | 2/1996 |
| EP | 0 551 091 A1 | | 7/1993 |
| EP | 1464430 A1 | | 10/2004 |
| JP | 55-54139 A | | 4/1980 |
| JP | 55054139 A | | 4/1980 |
| JP | 59-156618 A | * | 9/1984 |
| JP | 60-20136 B2 | | 5/1985 |
| JP | 61-146419 A | * | 7/1986 |
| JP | 61-159326 A | | 7/1986 |
| JP | 1-103228 A | * | 4/1989 |
| JP | 2-284820 A | | 11/1990 |
| JP | 5-177437 A | | 7/1993 |
| JP | 5-293714 A | | 11/1993 |
| JP | 6-91435 A | * | 4/1994 |
| JP | 8-323544 A | * | 12/1996 |
| JP | 10-217033 A | * | 8/1998 |

OTHER PUBLICATIONS

German Office Action dated Jun. 24, 2009.

* cited by examiner

POWER-SUPPLY CONTROL DEVICE FOR ELECTRICAL DISCHARGE MACHINING APPARATUS

TECHNICAL FIELD

The present invention relates to a power-supply control device that controls discharge pulses supplied to a die-sinking electrical discharge machining apparatus that machines a workpiece by generating pulse discharge in a machining gap between a machining electrode and the workpiece facing each other.

BACKGROUND ART

It has been known that, in a die-sinking electrical discharge machining apparatus that machines a workpiece by generating pulse discharge in a machining gap between a machining electrode and the workpiece facing each other, a discharge state during electrical discharge machining can be determined by detecting a high-frequency component in a discharge voltage and judging the size of the high-frequency component. Patent Document 1, for example, discloses such a technology for judging the discharge state from a high-frequency component.

FIG. 8 is a circuit diagram of relevant part of an electrical discharge machining apparatus substantively identical in configuration to that described in Patent Document 1. A pulsed discharge voltage is supplied to a machining gap between an electrode 2 of the electrical discharge machining apparatus and a workpiece 3. A high-pass filter 4 extracts a high-frequency component from the discharge voltage. A rectifier 5 rectifies the high-frequency component extracted by the high-pass filter 4 and outputs the rectified high-frequency component as an output signal Vrec. A discharge voltage detecting device 75 detects the discharge voltage at the machining gap between the electrode 2 and the workpiece 3. A discharge current detecting device 76 detects a discharge current at the machining gap between the electrode 2 and the workpiece 3.

An output signal u from the discharge voltage detecting device 75 and an output signal i from the discharge current detecting device 76 are input to a logic circuit 77. A time constant measuring device 70 and a logic circuit 72 constitute a delay circuit. The time constant measuring device 70 measures a time constant tH of the high-pass filter 4. An output signal 79 from the logic circuit 77 is input to the time constant measuring device 70 and the logic circuit 72. An output signal 71 from the time constant measuring device 70 is input to the logic circuit 72. An integrator circuit 9 includes a capacitor C1 and a resistor R1. The capacitor C1 is connected between an inverting (−) input side and an output side of an operational amplifier. The resistor R1 is serially connected between an output side of the rectifier 5 and the inverting (−) input side of the operational amplifier. A non-inverting (+) input side of the operational amplifier is grounded.

A reset circuit 10 includes a transistor. A collector-emitter of the transistor is connected between both terminals of the capacitor C1. An output signal 73 from the logic circuit 72 is input to the reset circuit 10. An integrated output value Vint that is an output signal from the operational amplifier of the integrator circuit 9 is input to an inverting (−) input side of a comparator 78. A reference voltage Vref is input to a non-inverting (+) input side of the comparator 78.

FIG. 9 is a timing chart of input and output signal waveforms in the electrical discharge machining apparatus shown in FIG. 8. A waveform A is a discharge voltage waveform at the machining gap between the electrode 2 and the workpiece 3. A waveform B is an output signal waveform from the high-pass filter 4. A waveform G is an output signal waveform from the logic circuit 77. A waveform H is an output signal waveform from the time constant measuring device 70. A waveform I is an output signal waveform from the logic circuit 72. A waveform F is an integrated output signal waveform from the integrator circuit 9.

Next, the operation is described with reference to FIGS. 8 and 9. In FIG. 9, a waveform 80 is the discharge voltage waveform at the machining gap between the electrode 2 and the workpiece 3. A time interval Ton indicates a discharge-pulse width. A time interval Toff indicates pulse off time. After a voltage is applied to the machining gap between the electrode 2 and the workpiece 3, an electrical discharge is generated. When the electrical discharge is generated, levels of output signals from the discharge voltage detecting device 75 and the discharge current detecting device 76 are both high (H). The output signals are input to the logic circuit 77. When the levels of both signals input to the logic circuit 77 are H or, in other words, when the electrical discharge is generated in the machining gap between the electrode 2 and the workpiece 3, the logic circuit 77 outputs a low (L) level signal. A time at which the logic circuit 77 outputs the L level signal is a discharge detection time t1. Time t2 is a time (t2=t1+tH) after the time constant tH of the high-pass filter 4, with the discharge detection time t1 as a starting point.

A waveform 82 indicates the high-frequency component of the discharge voltage. A waveform 83 indicates a disturbance waveform due to a transient characteristic of the high-pass filter 4. The time constant measuring device 70 outputs an H level signal during the time tH, with a time at which the output signal 79 from the logic circuit 77 falls as a starting point (H in FIG. 9). The output signal 79 from the logic circuit 77 and the output signal 71 from the time constant measuring device 70 are input to the logic circuit 72. The logic circuit 72 outputs the output signal 73, as indicated in I in FIG. 9. A time at which the output signal 73 falls is indicated by t2 in I in FIG. 9. The reset circuit 10 resets the integrator circuit 9 while a level of the output signal 73 from the logic circuit 72 is H. In other words, the integrator circuit 9 integrates the output signal Vrec from the rectifier 5 only while the level of the output signal 73 from the logic circuit 72 is L. The comparator 78 compares the reference voltage Vref with the integrated output Vint, indicated in F in FIG. 9. When the integrated output Vint is larger than the reference voltage Vref at an end of the discharge-pulse width Ton, the comparator 78 judges the discharge pulse to be a normal discharge pulse. When an opposite is true, the comparator 78 judges the discharge pulse to be an abnormal discharge pulse, such as an arc discharge pulse.

It has been known that the discharge state of the electrical discharge machining apparatus during electrical discharge machining can be judged by a detection of a discharge voltage level. Patent Document 2, for example, discloses such a technology for judging the discharge state from the discharge voltage level.

FIG. 10 is a circuit diagram of relevant part of an electrical discharge machining apparatus substantively identical in configuration to that described in Patent Document 2. In FIG. 10, like reference characters refer to portions corresponding to those shown in FIG. 8, and explanations thereof are omitted. A machining pulse generating circuit includes a machining power supply 1, an upstream resistor 100, and a switch 90. The switch 90 is controlled by a Schmitt trigger circuit 91, a first monostable flip-flop 92, a second monostable flip-flop 93, and an AND gate 94. The Schmitt trigger circuit 91 is used to detect the generation of the electrical discharge after the voltage is applied to the machining gap. The first monostable flip-flop 92 is used to fix the discharge-pulse width Ton. The second monostable flip-flop 93 is used to fix the pulse off time Toff of an interval between two discharge voltage pulses. One inputting unit of the AND gate 94 is connected to the flip-flop 93. Another inputting unit of the AND gate 94 is connected to a control circuit. The control circuit includes two comparators 95 and 96. The control circuit compares an upper threshold V2 and a lower threshold V1 of a voltage, serving as reference voltage values, with the discharge voltage at the machining gap. When a measured voltage is included in a middle of two reference voltages, an AND gate 97 sends one output signal during an elapse of time F, fixed by a monostable flip-flop 98.

FIG. 11 is a schematic diagram for explaining a relation between various discharge voltage waveforms 80 of the electrical discharge machining apparatus shown in FIG. 10 and current waveforms 84 based on a duration F of a voltage-read window. A waveform A is the discharge voltage waveform. A waveform B is an output signal waveform 85 of the duration F of the read window during which the voltage level of the discharge voltage waveform 80 is detected. A waveform C is the discharge current waveform 84. A form A1 and a form A2 of the discharge voltage waveform are higher than the upper threshold V2 (for example, 20 volts) of the discharge voltage. The pulse width of the discharge voltage and the current are held during the discharge-pulse width Ton. A form B1 and a form B2 of the discharge voltage waveform are lower, than the upper threshold V2 of the discharge voltage and higher than the lower threshold V1 (for example, 5 volts) of the voltage. The pulse width of the discharge voltage and the current are cut off after reading is completed. A form C of the discharge voltage waveform is lower than the lower threshold V1. The pulse width of the discharge voltage and the current are held during the discharge voltage width Ton.

A technology has been known in which the discharge state is improved by controlling the pulse off time and machining conditions are controlled to increase machining efficiency when the discharge pulse is judged to be abnormal. Such a technology is disclosed in, for example, Patent Document 1.

FIG. 12 is a circuit diagram of relevant part of another electrical discharge machining apparatus substantively identical in configuration to that described in Patent Document 1. In FIG. 12, like reference characters refer to portions corresponding to those shown in FIG. 8, and explanations thereof are omitted. The electrical discharge machining apparatus includes a short-circuit detecting device 28, a first comparator 29, a comparison-reference-value generating device 30, a second comparator 31, and a second comparison value generating device 32.

FIG. 13 is a timing chart of input and output signal waveforms in relevant part of a power-supply control device shown in FIG. 12. A waveform A is the discharge voltage waveform at the machining gap between the electrode 2 and the workpiece 3. A waveform B is the output signal waveform from the high-pass filter 4. A waveform C is an output signal waveform from the rectifier 5. A waveform P is an output signal waveform from a discharge detecting device 23. A waveform Q is an output signal waveform from a timer 24. A waveform F is an output signal waveform from the integrator circuit 9. A waveform S is an output signal waveform from the first comparator 29. The first comparator 29 compares an output from the discharge detecting device 23 with a first reference value. A waveform T is an output signal waveform from the second comparator 31. The second comparator 31 compares the output from the discharge detecting device 23 with a second reference value. A waveform U is an output signal waveform from the short-circuit detecting device 28.

Next, the operation is described with reference to FIGS. 12 and 13. The machining power supply 1 applies a pulsed voltage to the machining gap, and electrical discharge machining is performed. The high-pass filter 4 extracts only the high-frequency component from the discharge voltage waveform A output when the electrical discharge machining is performed. The extracted high-frequency component becomes the output signal waveform B. The rectifier 5 rectifies the acquired high-frequency component. The rectified high-frequency component becomes the output signal waveform C. The output signal waveform C is input to the integrator circuit 9. When the electrical discharge is generated, the output signal waveform P from the discharge detecting device 23 rises. The integrator circuit 9 is reset, and the timer 24 starts. The output signal waveform P becomes the output signal waveform Q. The integrator circuit 9 integrates the output signal waveform C. The output signal waveform C becomes the output signal waveform F. When the electrical discharge ends, a discharge detection output from the discharge detecting device 23 falls. With the fall of the discharge detection output, the first comparator 29 and the second comparator 31 output comparison results of a comparison of reference values from the first comparison-reference-value generating device 30 and the second comparison-reference-value generating device 32 (set lower than the first reference value) with the output from the integrator circuit 9. The first comparator 29 and the second comparator 31 output the comparison results as the output signal waveform S and the output signal waveform T. As a result, the discharge pulse is classified into three types that are the normal discharge pulse, a quasi-arc discharge pulse, and the arc discharge pulse.

The short-circuit detecting device 28 checks a voltage value at the machining gap when the discharge detection output falls. The short-circuit detecting device 28 compares the voltage value with a short-circuit reference voltage (preferably 15 volts or less) and outputs a short-circuit detection signal (the waveform U in FIG. 8). A short-circuited state described herein refers not only to a direct connection between the electrode 2 and the workpiece 3, but also a short-circuit via tar into which machining scraps and machining fluid have transformed, carbide film formed on an electrode surface, or the like. Therefore, the voltage value at the machining gap cannot be completely zero volts. A voltage of about several volts is generated. The short-circuit reference voltage differs depending on an electrode material, as does an arc discharge voltage. Therefore, there is no standard value for all cases. The short-circuit reference voltage is, for example, set to 15 volts or less and preferably 10 volts or less, when the electrode 2 is copper and the workpiece 3 is steel.

A machining-condition control device 27 acquires three types of identification outputs from the first comparator 29 and the second comparator 31. The three types are the normal discharge, the quasi-arc discharge, and the arc discharge. The machining-condition control device 27 also acquires two types of identification outputs from the short-circuit detecting device 28, indicating whether the short-circuited state is present. The machining-condition control device 27 acquires the identification outputs for each pulse. Therefore, the machining-condition control device 27 acquires classified identification outputs. When the short-circuited state is present, the machining-condition control device 27 does not change machining conditions. In the case of quasi-arc discharge, the machining-condition control device 27 switches the pulse off time to longer one. In the case of arc discharge, the machining-condition control device 27 switches the pulse off time to further longer one. In the case of non-short-circuited normal discharge, the machining-condition control device 27 shortens the pulse off time. As described above, in addition to recognition of the discharge state through whether the high-frequency component is present, the discharge pulse and the presence of the short-circuited state are judged, and the machining conditions is controlled. As a result, an optimum machining state is maintained.

Patent Document 1: Japanese Patent Application Laid-open No. H5-293714

Patent Document 2: Japanese Patent Application Laid-open No. S61-159326

DISCLOSURE OF INVENTION

Problem to be Solved by the Invention

The conventional electrical discharge machining apparatuses, however, have some problems. The first problem is described with reference to FIG. 14. FIG. 14 is a timing chart of input and output signal waveforms when a drop in arc voltage due to abnormal arc discharge occurs in the electrical discharge machining apparatus shown in FIG. 8. In FIG. 14, like reference characters refer to portions corresponding to those shown in FIG. 9, and explanations thereof are omitted. In the discharge voltage waveform 80, arc-voltage drops 84 and 85 may occur in addition to the high-frequency component 82. In the arc-voltage drops 84 and 85, the arc voltage decreases synchronously with the abnormal arc discharge generation (here, the waveform 84 shows a slight voltage drop, and the waveform 85 shows a voltage drop that is lower than the waveform 84 by a predetermined amount). The arc-voltage drops 84 and 85 frequently occur when the electrode 2 is formed of graphite material or the like. The arc-voltage drops 84 and 85 can be frequently seen not only immediately after a start of electrical discharge, but also after an elapse of a certain time exceeding half of the discharge-pulse width. When the arc-voltage drops 84 and 85 are present, the power-supply control device shown in FIG. 8 that detects the high-frequency component of the electrical discharge phenomenon cannot determine an accurate machining state.

The erroneous detection operation is described below. The arc-voltage drops 84 and 85 in the discharge voltage waveform A, shown in FIG. 14, cause disturbance waveforms to be generated in the output signal waveform B from the high-pass filter 4. The arc-voltage drops 84 and 85 in the discharge voltage waveform A also affect the output signal waveform F from the integrator circuit 9. In other words, when the arc-voltage drops 84 and 85 occur, an integrated output value of the output signal waveform F from the integrator circuit 9 increases, as indicated by a solid line in FIG. 14. The integrated output value Vint2 of the increased area becomes a value larger than the integrated output value Vint by a predetermined amount. The integrated output value Vint is the value that the integrated output should be. As a result, the high-frequency component due to a discharge phenomenon that should be detected cannot be accurately detected.

Next, the second problem is described. The case where the arc-voltage drops 84 and 85 occur during an interval of the discharge-pulse width Ton is described. The arc-voltage drops 84 and 85 occur when the discharge state deteriorates or the discharge phenomenon becomes abnormal. The arc-voltage drops 84 and 85 reduce efficiency of discharge machining and generation of arc discharge. Therefore, the discharge pulse should not be maintained in this state (the discharge-pulse width Ton should not be held). On the other hand, in the electrical discharge machining apparatus in FIG. 8, the judgment of the discharge, state is made by a comparison of the integrated output Vint with the reference voltage Vref upon completion of the discharge-pulse width Ton. The discharge state is held during the discharge-pulse width Ton. The discharge state detecting device shown in FIG. 8 that judges the discharge state at the end of the discharge-pulse width Ton cannot optimally control the discharge-pulse width Ton when the arc-voltage drops 84 and 85 occur.

In the electrical discharge machining apparatus shown in FIG. 10, when the discharge voltage at the machining gap is higher than the upper threshold V2 (for example, 20 volts) of the discharge voltage, the pulse width of the discharge voltage and the current are held during the pulse width Ton. When the discharge voltage is lower than the upper threshold V2 of the discharge voltage and higher than the lower threshold V1 (for example, 5 volts) of the discharge voltage, the pulse width Ton of the discharge voltage and the current are cut off upon completion of reading. Voltage levels in a read window significantly less than the discharge pulse at the start of the electrical discharge (after the generation of the electrical discharge is detected) are compared. A phenomenon in which the arc-voltage drops synchronously with the abnormal arc discharge generation at an arbitrary time within the discharge-pulse width Ton period cannot be read. The electrical discharge Machining apparatus shown in FIG. 8 that controls the pulse width Ton of the discharge voltage and the current using the voltage value observed at the start of the electrical discharge (after the generation of the electrical discharge is detected) cannot accurately detect the arc voltage drop. The electrical discharge machining apparatus also cannot optimally control the discharge-pulse width Ton.

When the upper threshold V2 of the discharge voltage is 20 volts, detection of abnormal pulses in the arc discharge is effective. However, formation of granular projections (carbide depositions) in an electrode corner area occurring when the electrode is formed of graphite material cannot be reduced.

Next, the third problem is described with reference to FIG. 15. FIG. 15 is a timing chart of input and output signal waveforms when a drop in arc voltage due to abnormal arc discharge occurs in the electrical discharge machining apparatus shown in FIG. 12. In FIG. 15, like reference characters refer to portions corresponding to those shown in FIG. 13, and explanations thereof are omitted. In the discharge voltage waveform 80, arc-voltage drops synchronous with the abnormal arc discharge generation, indicated by the waveforms 84 and 85, and a waveform 86, may occur in addition to the high-frequency component 82. The arc-voltage drops 84, 85, and 86 frequently occur when the electrode 2 is formed of graphite material or the like. The arc-voltage drops 84, 85, and 86 can be frequently seen not only immediately after the start of the electrical discharge, but also after the elapse of a certain time exceeding half of the discharge-pulse width. The electrical discharge machining apparatus in FIG. 12 maintains an optimal machining state by judging the discharge state depending on the presence of the high-frequency component, classifying the discharge pulse into three types using the discharge state in addition to whether the short-circuit state is present, and controlling the machining conditions based on the classification, at the end of the discharge-pulse width. In the electrical discharge machining apparatus in FIG. 12, when the arc-voltage drops 84, 85, and 86, such as those described above, are present, erroneous control of the machining conditions occurs due to erroneous detection of discharge pulses.

The erroneous detection operation is described. When the arc-voltage drops 84, 85, and 86 occur, the output signal waveform from the integrator circuit 9 becomes a waveform such as waveform F in FIG. 15 and is recognized as either the quasi-arc discharge pulse or the arc-discharge pulse. At the arc-voltage drops 84 and 85, the pulse off time is switched to longer one. At the arc-voltage drop 86, the pulse off time is switched to further longer one. The discharge voltages of the arc-voltage drops 85 and 86, in which the arc voltages have dropped, reduce the generation of the arc discharges and the electrical discharge machining efficiency. The discharge pulse should not be maintained (the discharge-pulse width should not be held for a long period of time). In the electrical discharge machining apparatus in FIG. 12 that judges the discharge state and controls pulse off time at the end of the discharge-pulse width, the judgment of the discharge state becomes delayed. The electrical discharge machining apparatus cannot accurately control the pulse off time when the arc-voltage drops 84, 85, and 86 occur.

The present invention has been achieved to solve the above problems in the conventional technology and it is an object of the present invention to provide a power-supply control device for electrical discharge machining apparatus that can accurately detect a discharge state and accurately control a discharge pulse and an pulse off time based on the discharge state, even when an arc-voltage drop occurs.

Means for Solving Problem

To overcome the above problems, according to an aspect of the present invention; a power-supply control device for electrical discharge machining apparatus that controls discharge pulses supplied to an electrical discharge machining apparatus that machines a workpiece by generating pulse discharges in a machining gap between a machining electrode and the workpiece facing each other, includes a voltage level detecting unit that detects a discharge voltage level at the machining gap, a no-load time detecting unit that detects no-load time of a discharge voltage at the machining gap, a voltage level comparing unit that compares the detected discharge voltage level with a reference voltage level, and a pulse control unit that controls pulse off time based on a comparison result obtained by the voltage level comparing unit and the no-load time.

According to another aspect of the present invention, a power-supply control device for electrical discharge machining apparatus that controls discharge pulses supplied to an electrical discharge machining apparatus that machines a workpiece by generating pulse discharges in a machining gap between a machining electrode and the workpiece facing each other, includes a high-frequency component detecting unit that detects a high-frequency component of discharge voltage at the machining gap, a voltage level detecting unit that detects a discharge voltage level at the machining gap, a no-load time detecting unit that detects no-load time of the discharge voltage at the machining gap, a high-frequency component comparing unit that compares the detected high-frequency component with a reference high-frequency component, a voltage level comparing unit that compares the detected discharge voltage level with a reference voltage level, and a pulse control unit that controls pulse off time based on a comparison result obtained by the high-frequency component comparing unit and the no-load time, and cuts off a discharge pulse based on a comparison result obtained by the voltage level comparing unit.

Effect of the Invention

In the power-supply control device for electrical discharge machining apparatus according to the present invention, the pulse control unit controls pulse off time based on a comparison result from the high-frequency component comparing, unit and no-load time. The pulse control unit also cuts off a discharge pulse based on a comparison result from the voltage level comparing unit. Therefore, even when an arc-voltage drop occurs, the discharge state can be detected accurately. Based on the discharge state, the discharge pulse and the pulse off time can be controlled accurately.

EXPLANATIONS OF LETTERS OR NUMERALS

Figure 1:
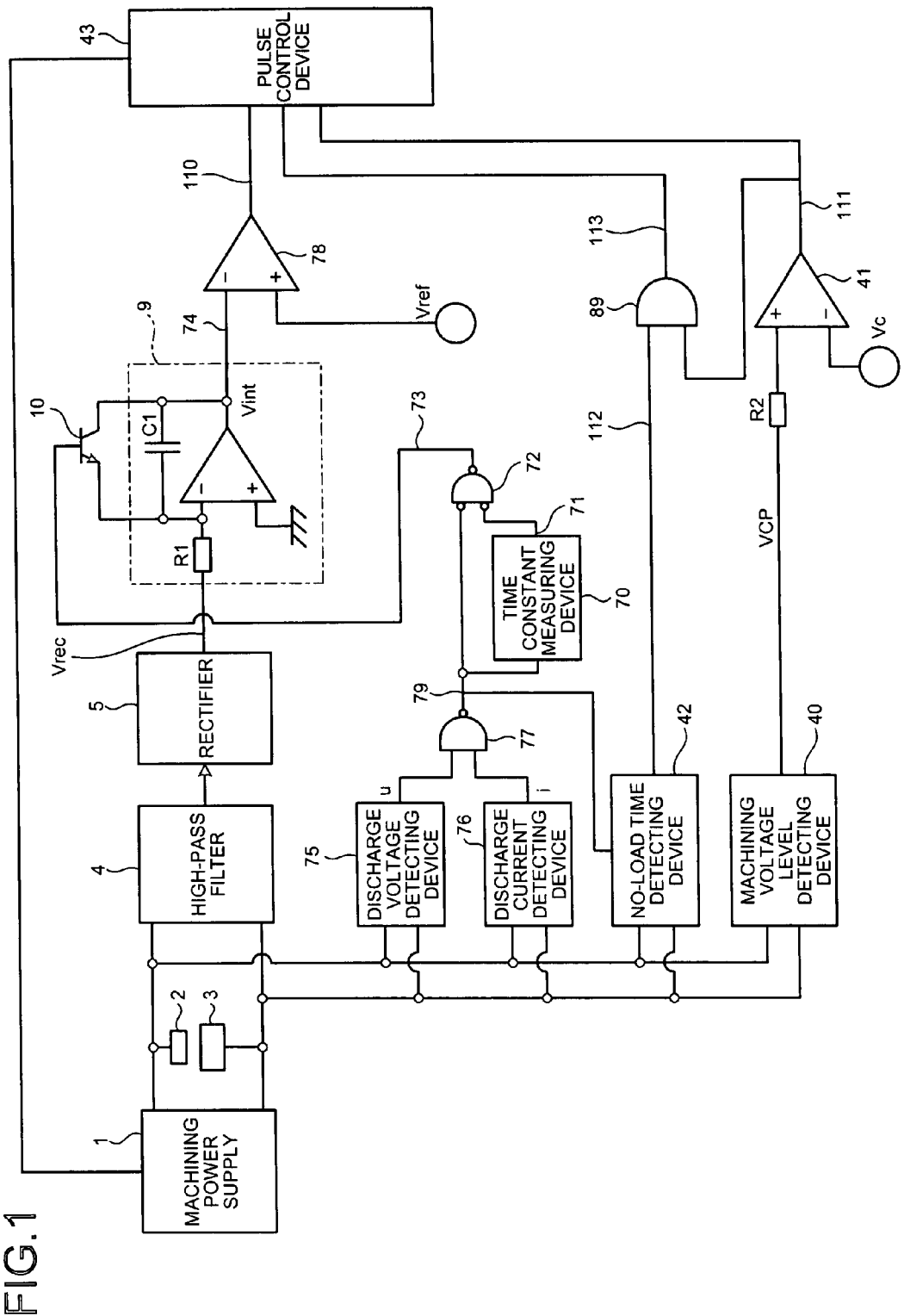
FIG. 1 is a schematic circuit diagram of relevant part of a power-supply control device for electrical discharge machining apparatus according to a first embodiment of the present invention.

1 Machining power supply
2 Electrode
3 Workpiece

4 High-pass filter (high-frequency component detecting unit)
5 Rectifier (high-frequency component detecting unit)
9 Integrator circuit (high-frequency component detecting unit)
10 Reset circuit
23 Discharge detecting device
24 Timer
27 Machining-condition control device
28 Short-circuit detecting device
29 First comparator
30 First comparison-reference-value generating device
31 Second comparator
32 Second comparison-reference-value generating device
40 Machining voltage level detecting device (voltage level detecting-unit)
41 Comparator (voltage level comparing unit)
42 No-load time detecting device (no-load time detecting unit)
43 Pulse control device (pulse control unit)
44 Switching element
45 Average off-time calculating device (average off-time calculating unit)
46 Good/bad pulse counter (pulse counting unit)
47 Machining stability judging device (machining stability judging unit)
48 Machining-condition control device (machining-condition control unit)
70 Time constant measuring device
72 Logic circuit
75 Discharge voltage detecting device
76 Discharge current detecting device
77 Logic circuit
78 Comparator (high-frequency component comparing unit)
89 Logic circuit

BEST MODE(S) FOR CARRYING OUT THE INVENTION

A power-supply control device for electrical discharge machining apparatus according to exemplary embodiments of the present invention are explained in detail below with reference to the accompanying drawings. However, it should be understood that the present invention is not limited by the embodiments.

First Embodiment

FIG. 1 is a schematic circuit diagram of relevant part of a power-supply control device for electrical discharge machining apparatus according to a first embodiment of the present invention. A pulsed discharge voltage is supplied to a machining gap between the electrode 2 of the electrical discharge machining apparatus and the workpiece 3. The high-pass filter 4 extracts a high-frequency component from the discharge voltage. The rectifier 5 rectifies the high-frequency component extracted by the high-pass filter 4 and outputs an output signal Vrec. The discharge voltage detecting device 75 detects the discharge voltage at the machining gap between the electrode 2 and the workpiece 3. The discharge current detecting device 76 detects a discharge current at the machining gap between the electrode 2 and the workpiece 3.

An output signal u from the discharge voltage detecting device 75 and an output signal i from the discharge current detecting device 76 are input to the logic circuit 77. The time constant measuring device 70 and the logic circuit 72 constitute a delay circuit. The time constant measuring device 70 measures a time constant tH of the high-pass filter 4. The output signal 79 from the logic circuit 77 is input to the time constant measuring device 70 and the logic circuit 72. The output signal 71 from the time constant measuring device 70 is input to the logic circuit 72. The integrator circuit 9 includes a capacitor C1 and a resistor R1. The capacitor C1 is connected between an inverting (−) input side and an output side of an operational amplifier. The resistor R1 is serially connected between an outputting side of the rectifier 5 and the inverting (−) input side of the operational amplifier. A non-inverting (+) input side of the operational amplifier is grounded.

The reset circuit 10 includes a transistor. A collector-emitter of the transistor is connected between both terminals of the capacitor C1. The output signal 73 from the logic circuit 72 is input to the reset circuit 10. An integrated output value Vint that is an output signal from the operational amplifier of the integrator circuit 9 is input to an inverting (−) input side of the comparator (high-frequency component comparing unit) 78. A reference voltage Vref is input to a non-inverting (+) input side of the comparator 78. A high-frequency component detecting unit that detects the high-frequency component of the discharge voltage at the machining gap between the electrode 2 and the workpiece 3 includes the high-pass filter 4, the rectifier 5, and the integrator circuit 9.

Figure 8:
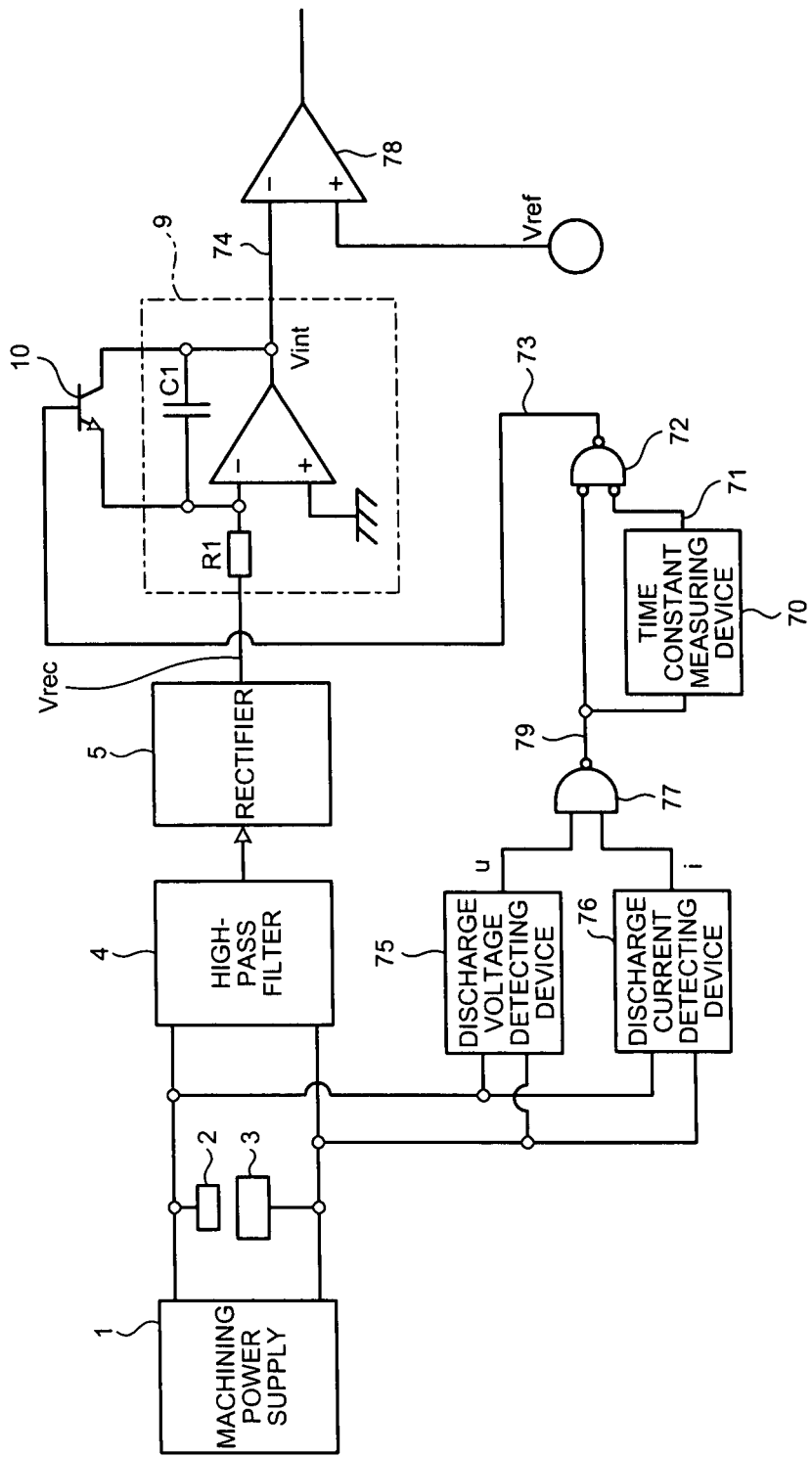
FIG. 8 is a circuit diagram of relevant part of a conventional electrical discharge machining apparatus substantively identical in configuration to that described in Patent Document 1.
Figure 9:
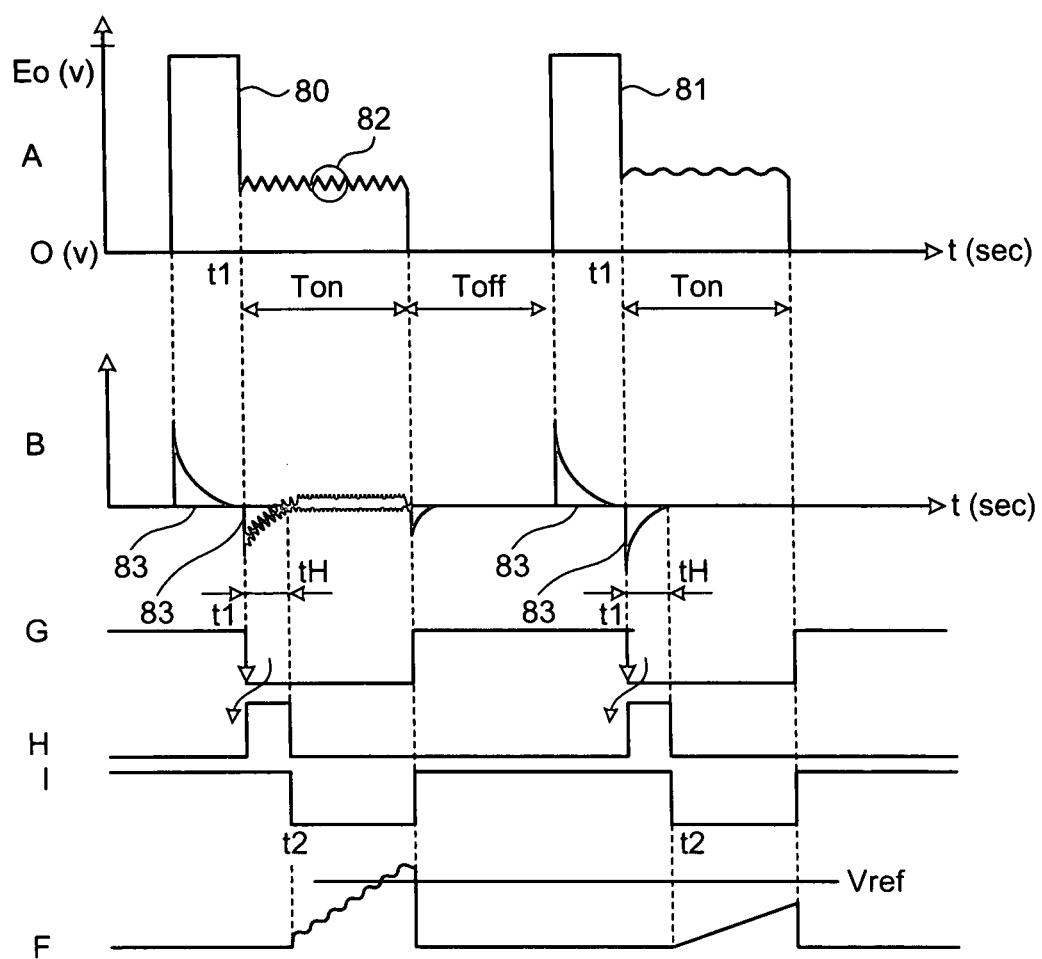
FIG. 9 is a timing chart of input and output signal waveforms in the electrical discharge machining apparatus shown in FIG. 8.
Figure 10:
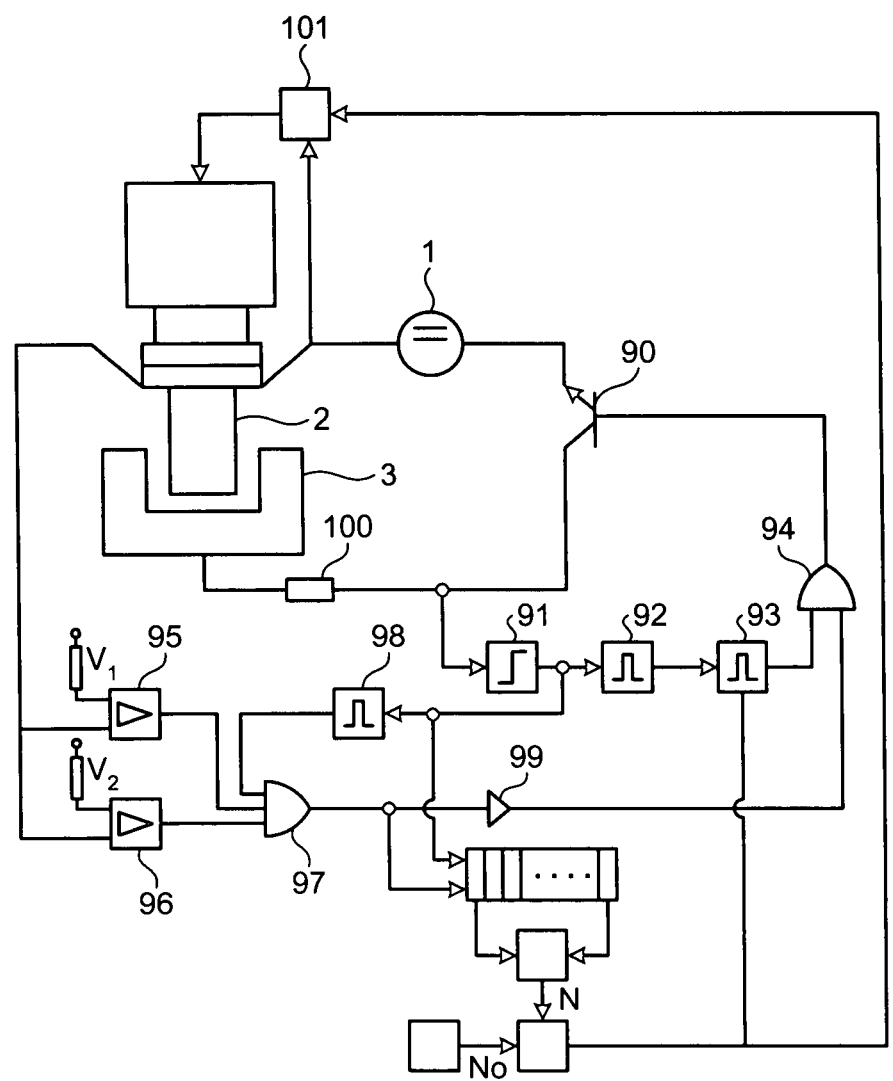
FIG. 10 is a circuit diagram of relevant part of an electrical discharge machining apparatus substantively identical in configuration to that described in Patent Document 2.
Figure 11:
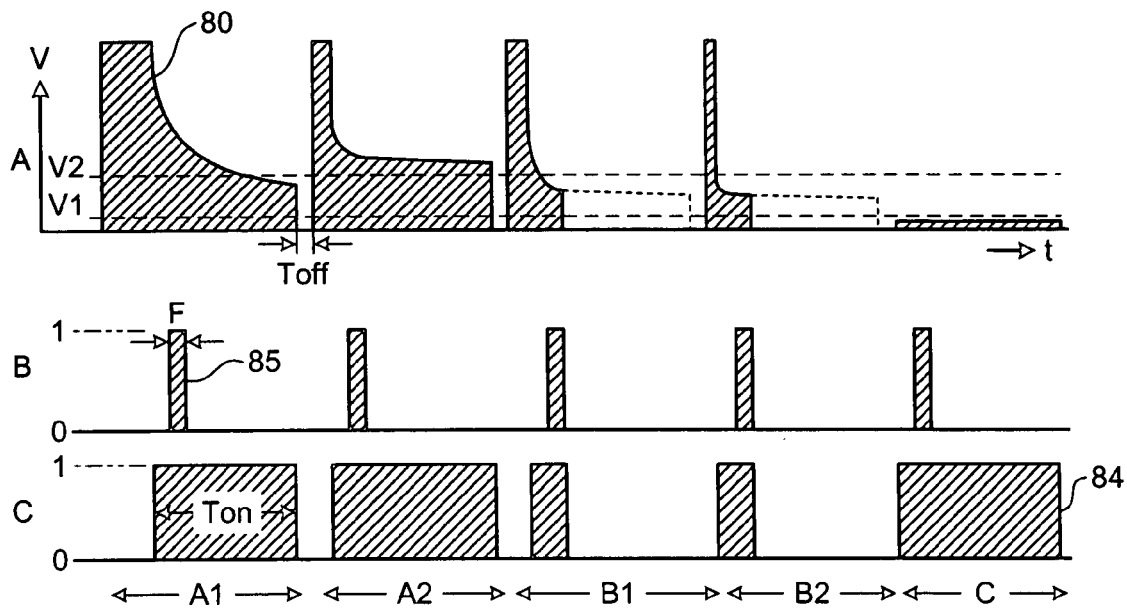
FIG. 11 is a timing chart of input and output signal waveforms in the electrical discharge machining apparatus shown in FIG. 10.

In addition to the conventional configuration shown in FIG. 8, the power-supply control device according to the present embodiment includes a machining voltage level detecting device (voltage level detecting unit) 40, a comparator (voltage level comparing unit) 41, a no-load time detecting device (no-load time detecting unit) 42, and the logic circuit 89. The machining voltage level detecting device 40 detects a discharge voltage level at the machining gap between the electrode 2 and the workpiece 3. A VCP voltage that is an output signal from the machining voltage level detecting device 40 is input to a non-inverting (+) input side of the comparator 41. A reference voltage Vc is input to an inverting (−) input side of the comparator 41. An output signal 111 from the comparator 41 is input to a pulse control device (pulse control unit) 43 and the logic circuit 89. The no-load time detecting device 42 measures a time from when the voltage is applied to the machining gap between the electrode 2 and the workpiece 3 until the output signal is output from the logic circuit 77 and compares the measured time with a reference time t, thereby detecting a quick discharge. An output signal 112 from the no-load time detecting device 42 is input to the logic circuit 89. An output signal 113 from the logic circuit 89 is input to the pulse control device (pulse control unit) 43.

Figure 2:
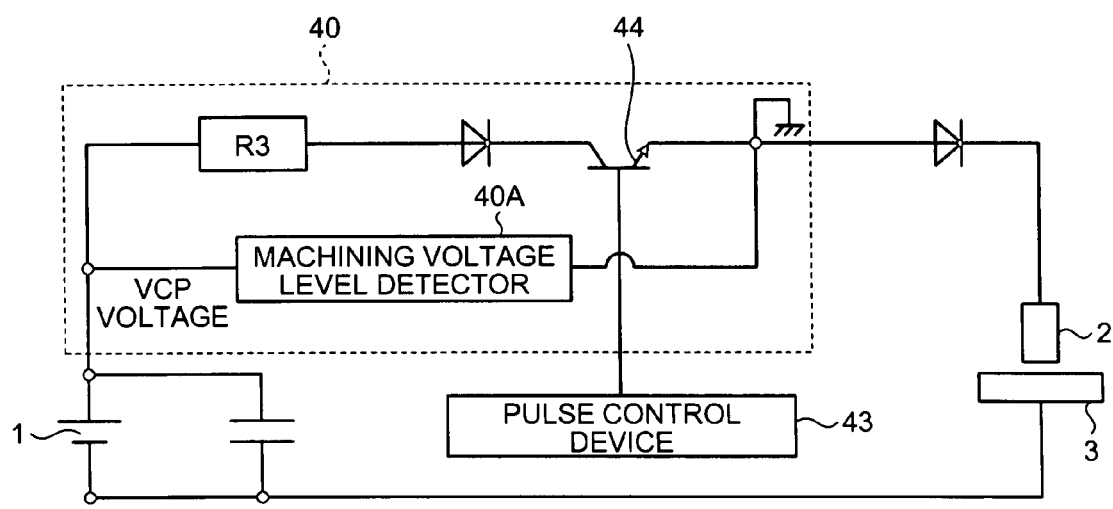
FIG. 2 is a circuit diagram of an example of a machining voltage level detecting device of the power-supply control device for electrical discharge machining apparatus.

FIG. 2 is a circuit diagram of an example of the machining voltage level detecting device 40 of the power-supply control device for electrical discharge machining apparatus. In the example, the machining voltage level detecting device 40 includes a machining voltage level detector 40A, a switching element 44, and a current detection resistor R3. To the machining voltage level detector 40A, a direct-current power supply serving as the machining power, supply 1 and the electrode 2 are connected. The switching element 44 operates based on a result of a control signal from the pulse control device 43.

Figure 3:
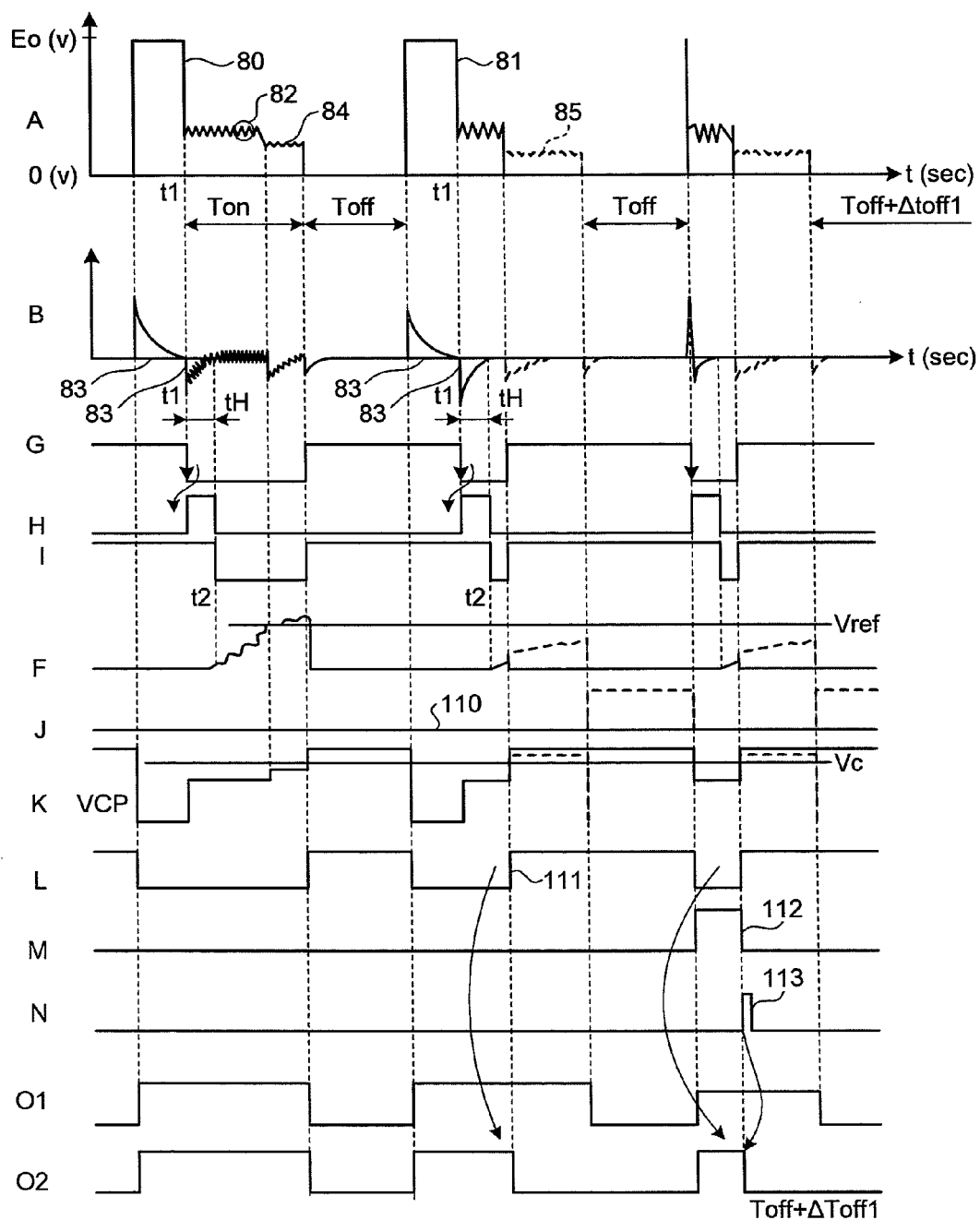
FIG. 3 is a timing chart of input and output signal waveforms in the power-supply control device for electrical discharge machining apparatus shown in FIG. 1.

FIG. 3 is a timing chart of input and output signal waveforms in the power-supply control device for electrical discharge machining apparatus shown in FIG. 1. A waveform A is the discharge voltage waveform at the machining gap between the electrode 2 and the workpiece 3. A waveform b is the output signal waveform from the high-pass filter 4. A waveform G is the output signal waveform from the logic circuit 77. The waveform H is the output signal waveform from the time constant measuring device 70. The waveform I is the output signal waveform from the logic circuit 72. A waveform F is the integrated output signal waveform from the integrator circuit 9. A waveform J is an output signal waveform from the comparator 78. A waveform k is an output signal waveform from the machining voltage level detecting device 40. A waveform L is an output signal waveform from the comparator 41. A waveform M is an output signal waveform from the no-load time detecting device 42. A waveform N is an output signal waveform from the logic circuit 89. A waveform O1 is a first output signal waveform from the pulse control device 43. A waveform O2 is a second output signal waveform from the pulse control device 43.

Next, the operation is described with reference to FIGS. 1, 2, and 3. In FIG. 3, the waveform 80 is the discharge voltage waveform at the machining gap between the electrode 2 and the workpiece 3. The time interval Ton indicates the discharge-pulse width. The time interval Toff indicates pulse off time. The electrical discharge is generated after the voltage is applied to the machining gap between the electrode 2 and the workpiece 3. When the electrical discharge is generated, the levels of the output signals from the discharge voltage detecting device 75 and the discharge current detecting device 76 are both H (high). The output signals are input to the logic circuit 77. When both the signals input to the logic circuit 77 are at H level, in other words, when the electrical discharge is generated in the machining gap between the electrode 2 and the workpiece 3, the logic circuit 77 outputs an L (low) level signal. A time at which the logic circuit 77 outputs the L level signal is a discharge detection time t1. Time t2 is a time (t2=t1+tH) after the time constant tH of the high-pass filter 4, with the discharge detection time t1 as a starting point.

The waveform 82 indicates the high-frequency component of the discharge voltage. The waveform 83 indicates a disturbance waveform due to a transient characteristic of the high-pass filter 4. The time constant measuring device 70 outputs an H level signal for a period of the time tH, with a time at which the output signal 79 from the logic circuit 77 falls as a starting point (H in FIG. 3). The output signal 79 from the logic circuit 77 and the output signal 71 from the time constant measuring device 70 are input to the logic circuit 72. The logic circuit 72 outputs the output signal 73, as indicated in I in FIG. 3. A time at which the output signal 73 falls is indicated in I in FIG. 3 as t2. The reset circuit 10 resets the integrator circuit 9 while a level of the output signal 73 from the logic circuit 72 is high. In other words, the integrator circuit 9 integrates the output signal Vrec from the rectifier 5 only while the level of the output signal 73 from the logic circuit 72 is low. The comparator 78 compares the reference voltage Vref with the integrated output Vint, indicated in F in FIG. 3. When the integrated output Vint is larger than the reference voltage Vref at an end of the discharge-pulse width Ton, the comparator 78 judges the discharge pulse to be the normal discharge pulse. When the opposite is true, the comparator 78 judges the discharge pulse to be the abnormal discharge pulse, such as arc discharge pulse. The comparator 78 outputs an output signal J In the example shown in FIG. 2, the machining voltage level detecting device 40 detects a voltage flowing through the current detection resistor R3 in FIG. 2. A method can be used in which an electrode gap is directly detected, as shown in FIG. 1. Then, the machining voltage level detecting device 40 outputs an output signal K of a voltage waveform that is an opposite of the discharge voltage, as shown in FIG. 3. The comparator 41 compares the reference voltage Vc with the output signal from the machining voltage level detecting device 40. When the output VCP voltage from the machining voltage level detecting device 40 is larger than the reference voltage Vc, the discharge pulse is judged to be the abnormal discharge pulse. The output signal L shown in FIG. 3 is output. The reference voltage Vc differs depending on the electrode material and the like. Therefore, there is no standard value. However, for example, when the graphite electrode machines steel, the reference voltage Vc is set to a voltage value of 20 volts to 25 volts. Alternatively, the reference voltage Vc is set to a voltage value equivalent to 25% to 30% of an interelectrode open voltage (for example, 80 volts) of a main power supply of a power supply circuit.

The no-load time detecting device 42 detects the time from when the voltage is applied to the machining gap between the electrode 2 and the workpiece 3 until the output signal 79 is output from the logic circuit 77 (falling output signal of the discharge detection output signal). The no-load time detecting device 42 compares the detected time with the reference time t. When the detected time is shorter than the reference time t, the discharge is judged to be the quick discharge. The output signal 112 indicated in M in FIG. 3 is output. Here, the reference time t differs depending on the electrode material and the like. Therefore, there is no standard value. However, for example, when the graphite electrode machines steel, the reference time t is set to be 3 microseconds or less. When the level of the output signal 111 from the comparator 41 is "H" and the output signal 111 is output while the level of the output signal 112 from the no-load time detecting device 42 is "H", the logic circuit 89 outputs an "H" level signal. In other words, when the quick discharge is generated in the machining gap between the electrode 2 and the workpiece 3 and the abnormal discharge in which the machining voltage level is low is generated, the discharge pulse is judged to be the abnormal discharge pulse. The output signal 113 indicated in N in FIG. 3 is output.

Next, discharge-pulse control performed by the pulse control device 43 that operates based on an output signal 110 from the comparator 78, the output signal 111 from the comparator 41, and the output signal 113 from the no-load time detecting device 42 is explained. When the level of the output signal 111 from the comparator 41 is "H" (L in FIG. 3) and the discharge pulse is judged to be the abnormal discharge pulse, the pulse width of the discharge voltage and the current are cut off. At this time, the comparator 78 does not compare the integrated output Vint with the reference voltage Vref at the end of the discharge-pulse width. As indicated by a dotted line in FIG. 3 that is not actually operated, when the level of the output signal 110 from the comparator 78 is "H", the discharge pulse is judged to be the abnormal discharge pulse, and the pulse off time is switched to longer one.

In addition, when the level of the output signal 113 from the logic circuit 89 is "H" (N in FIG. 3), pulse off time ΔToff is added to the set pulse off time Toff, and the pulse off time is switched to longer one.

With the above-described configuration, the electrical discharge machining state can be accurately detected, and whether the discharge pulse is normal or abnormal can be accurately judged. The machining pulse width and the pulse off-time width are controlled based on the presence of the high-frequency component and the discharge conditions according to the machining voltage level and the no-load time. Therefore, the generation of continuous arcs in the machining gap can be prevented. Damage to the electrode or the workpiece can also be prevented. The reference voltage Vc is between the normal discharge pulse (machining voltage is about 30 volts when the electrode is formed of graphite material) and the abnormal discharge pulse (the machining voltage is about 20 volts when the electrode is formed of graphite material). When the pulse width Ton of the discharge voltage is cut off and the pulse off time is extended when the voltage level is detected and the no-load time is small, formation of granular projections (carbide depositions) is significantly reduced.

According to the present embodiment, discharge pulses and pulse off time are controlled immediately after abnormal discharge pulses are classified and identified; however, discharge pulses and pulse off time can be controlled when the count of classified and identified output signals reaches a predetermined value. Other than or in addition to pulse off-time control, machining conditions such as jump-down time and jump-up distance can be controlled. Besides, the machining voltage level detecting device 40 employs a voltage waveform opposite to a discharge voltage to detect a discharge voltage level as shown in FIG. 2; however, an electrode gap can be directly detected as, shown in FIG. 1.

Second Embodiment

Figure 4:
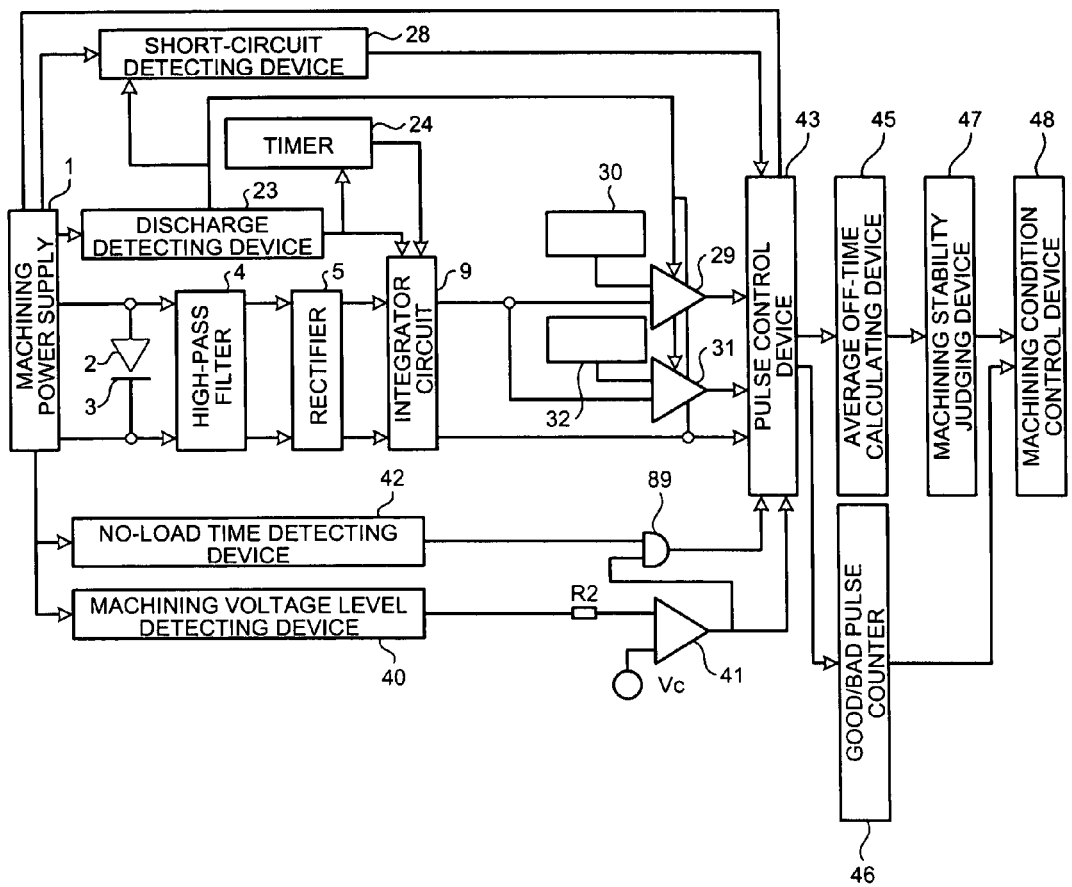
FIG. 4 is a functional block diagram of relevant part of a power-supply control device for electrical discharge machining apparatus according to a second embodiment of the present invention, a portion of which is a circuit diagram.

FIG. 4 is a functional block diagram of relevant part of a power-supply control device for electrical discharge machining apparatus according to a second embodiment of the present invention. A portion of the diagram is a circuit diagram. The machining gap is formed between the electrode 2 and the workpiece 3. The machining power supply 1 supplies the pulsed discharge voltage to the machining gap. The high-pass filter 4 detects the high-frequency component from the discharge voltage. The rectifier 5 rectifies the high-frequency component from the high-pass filter 4. The rectifier 5 outputs the rectified output signal. The discharge detecting device 23 detects the discharge voltage and the discharge current at the machining gap between the electrode 2 and the workpiece 3. The integrator circuit 9 is reset and the timer 24 is started by the output from the discharge detecting device 23. A short-circuit detecting device 38 is provided as a short-circuit detecting unit. The first comparator 29 is provided as a comparing unit for performing a comparison with the first reference value. The first comparison-reference-value generating device 30 is provided as a first comparison reference value generating unit. The second comparator 31 is provided as a comparing unit for performing a comparison with the second reference value. The second comparison-reference-value generating device 32 is provided as a second comparison reference value generating unit.

Figure 12:
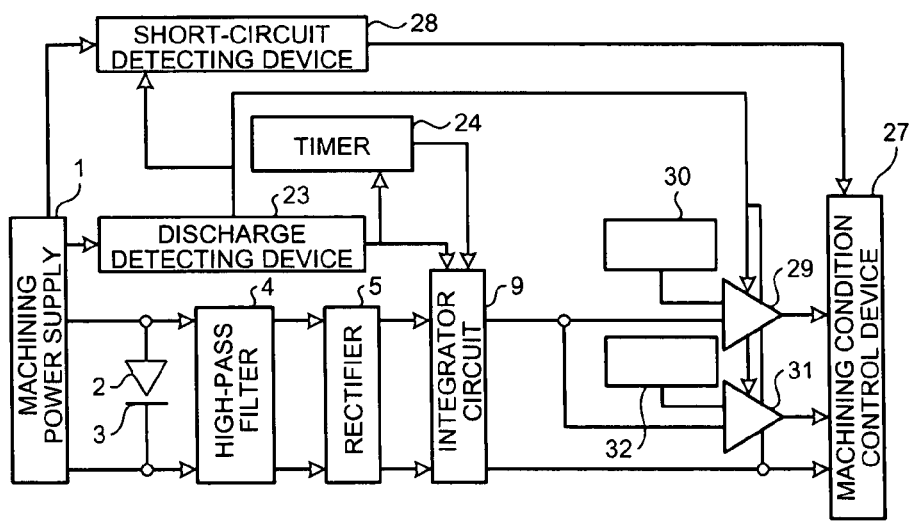
FIG. 12 is a circuit diagram of relevant part of another electrical discharge machining apparatus substantively identical in configuration to that described in Patent Document 1.
Figure 13:
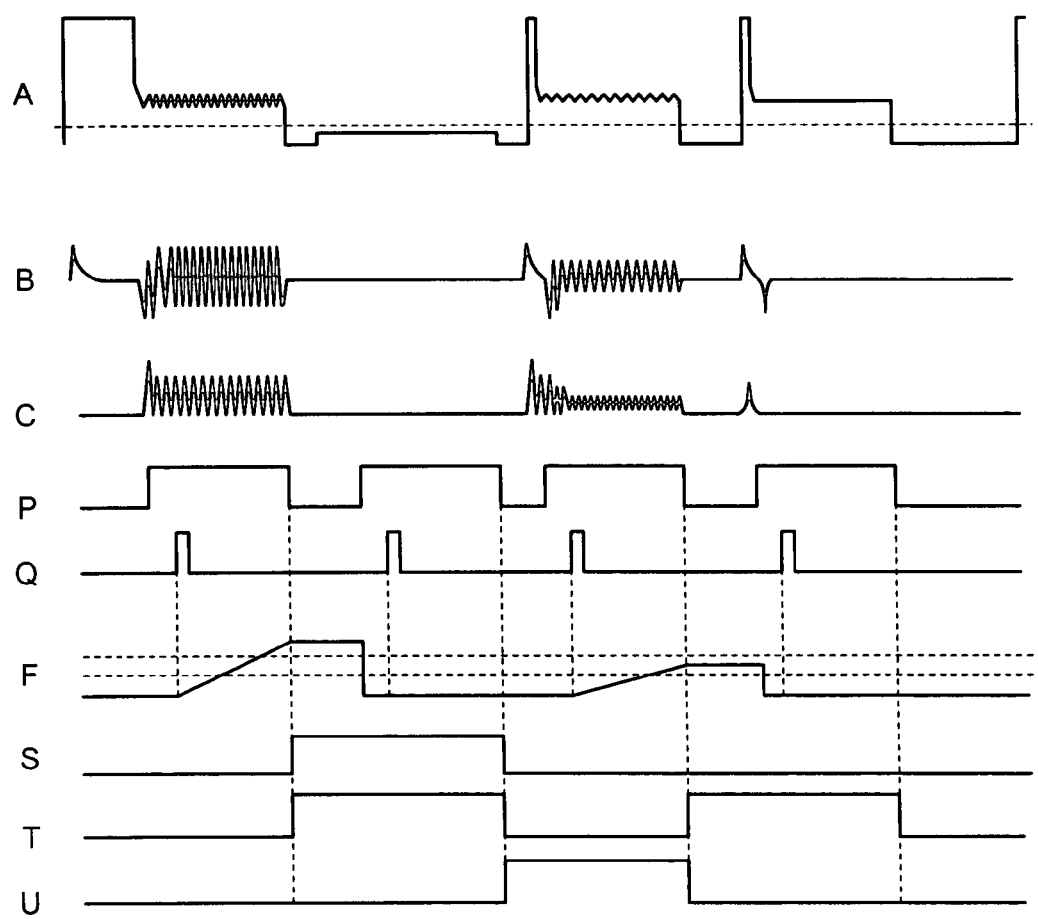
FIG. 13 is a timing chart of input and output signal waveforms in the electrical discharge machining apparatus shown in FIG. 12.
Figure 14:
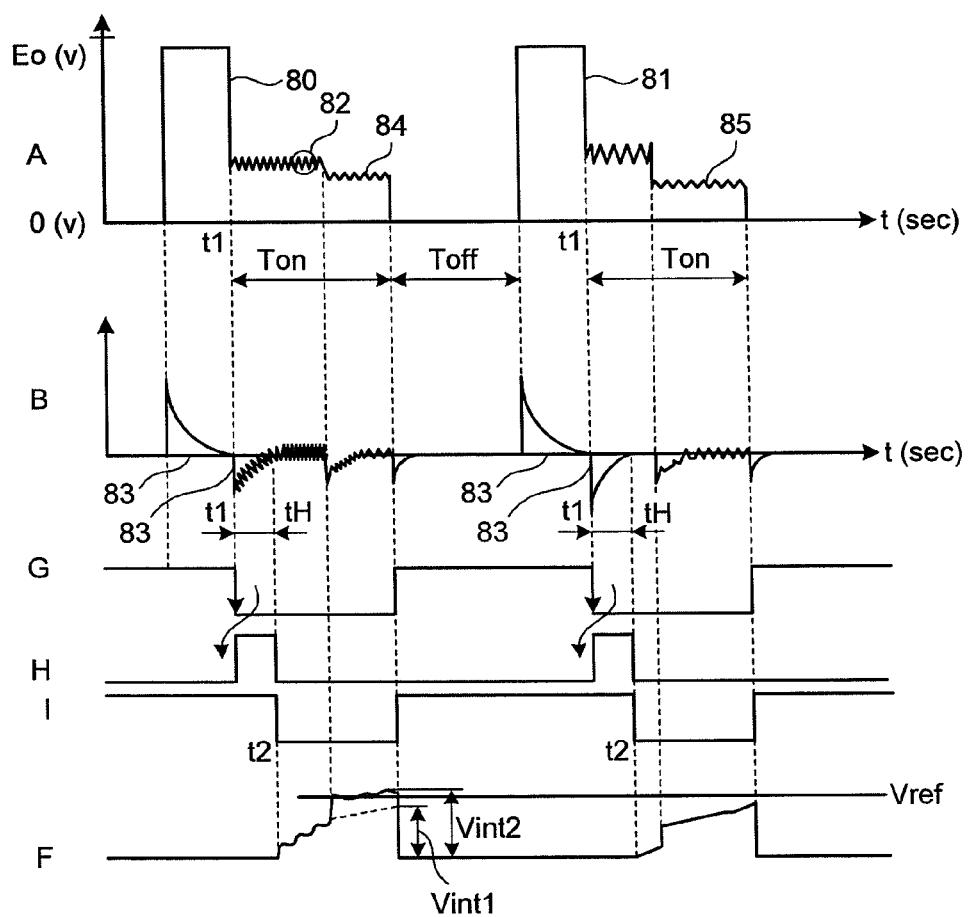
FIG. 14 is a timing chart of input and output signal waveforms when a drop in arc voltage due to abnormal arc discharge occurs in the electrical discharge machining apparatus shown in FIG. 8.
Figure 15:
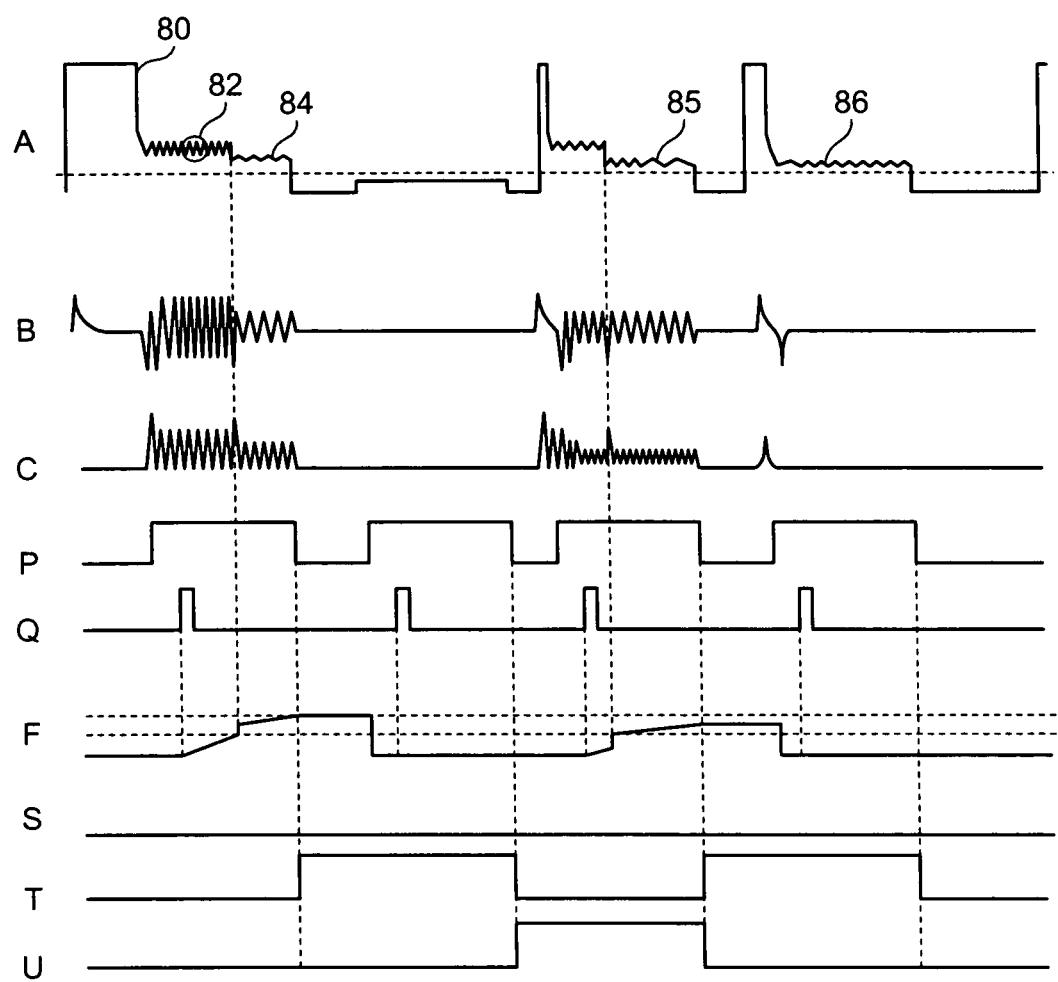
FIG. 15 is a timing chart of input and output signal waveforms when a drop in arc voltage due to abnormal arc discharge occurs in the electrical discharge machining apparatus shown in FIG. 12.

The power-supply control device according to the present embodiment includes, in addition to the conventional configuration shown in FIG. 12, the machining voltage level detecting device (voltage level detecting unit) 40, the comparator (voltage level comparing unit) 41, the no-load time detecting device (no-load time detecting unit) 42, and a logic circuit 89, as in the first embodiment. The machining voltage level detecting device 40 detects the discharge voltage level at the machining gap between the electrode 2 and the workpiece 3. The output signal from the machining voltage level detecting device 40 and the reference voltage Vc are input to the comparator 41. The output signal from the comparator 41 is input to the pulse control device 43. The no-load time detecting device 42 measures the time from when the voltage is applied to the machining gap between the electrode 2 and the workpiece 3 until the discharge voltage and the discharge current are detected, and compares the measured time with a reference time t, thereby detecting a quick discharge. The output signal from the no-load time detecting device 42 is input to the logic circuit 89 with the output signal from the comparator 41. The output signal from the logic circuit 89 is input to the pulse control device 43.

The power-supply control device according to the present embodiment includes, in addition to the conventional configuration shown in FIG. 12, an average off-time calculating device (average off-time calculating unit) 45, a good/bad pulse counter (pulse counting unit) 46, a machining stability judging device (machining stability judging unit) 47, and a machining-condition control device (machining-condition control unit) 48.

The average off-time calculating device 45 determines an average of fluctuating off-time values of the discharge pulse controlled by the pulse control device 43. The good/bad pulse counter 46 counts the normal discharge pulses, which are discharge pulses that have been judged to be normal. The machining stability judging device 47 judges whether a machining state is "stable" or "unstable" by the average pulse off time determined by the average off-time calculating device 45. The machining-condition control device 48 switches the machining conditions based on an output from the machining stability judging device 47.

Figure 5:
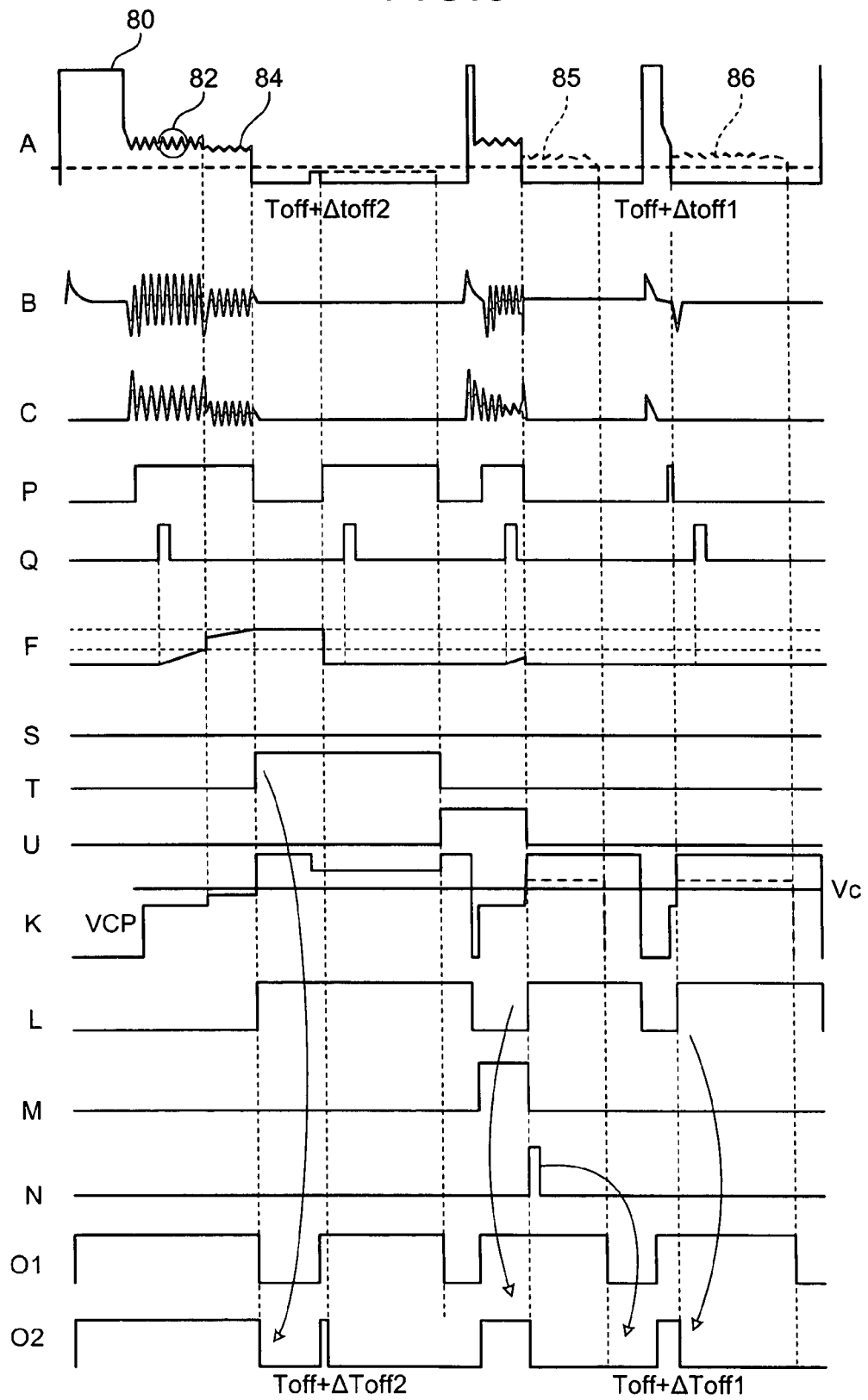
FIG. 5 is a timing chart of input and output signal waveforms in the power-supply control device for electrical discharge machining apparatus shown in FIG. 4.

FIG. 5 is a timing chart of input and output signal waveforms in the power-supply control device for electrical discharge machining apparatus shown in FIG. 4. A waveform A is the discharge voltage waveform at the machining gap between the electrode 2 and the workpiece 3. A waveform B is the output signal waveform from the high-pass filter 4. A waveform C is the output signal waveform from the rectifier 5. A waveform P is the output signal waveform from the discharge detecting device 23. A waveform Q is the output signal waveform from the timer 24. A waveform F is the output signal waveform from the integrator circuit 9. A waveform S is the output signal waveform from the first comparator 29. The first comparator 29 compares the output from the discharge detecting device 23 with the first reference value. A waveform T is the output signal waveform from the second comparator 31. The second comparator 31 compares the output from the discharge detecting device 23 with the second reference value. A waveform U is the output signal waveform from the short-circuit detecting device 28. A waveform K is the output signal waveform from the machining voltage level detecting device 40. A waveform L is the output signal waveform from the comparator 41. A waveform M is the output signal waveform from the no-load time detecting device 42. A waveform N is the output signal waveform from the logic circuit 89. A waveform O1 is the first output signal waveform from the pulse control device 43. A waveform O2 is the second output signal waveform from the pulse control device 43.

Next, the operation is described with reference to FIGS. 4 and 5. The machining power supply 1 applies the pulsed voltage to the machining gap, and the electrical discharge machining is performed. The high-pass filter extracts only the high-frequency component from the discharge voltage waveform A output when the electrical discharge machining is performed. The extracted high-frequency component becomes the output signal waveform B. The rectifier 5 rectifies the acquired high-frequency component. The rectified high-frequency component becomes the output signal waveform C. The output signal waveform C is input to the integrator circuit 9. When the electrical discharge is generated, the output signal waveform P from the discharge detecting device 23 rises. The integrator circuit 9 is reset and the timer 24 starts. The output signal waveform P becomes the output signal waveform Q. The integrator circuit 9 integrates the output signal waveform C. The output signal waveform C becomes the output signal waveform F. When the electrical discharge ends, the discharge detection output from the discharge detecting device 23 falls. With the fall of the discharge detection output, the first comparator 29 and the second comparator 31 output comparison results of a comparison of the output from the integrator circuit 9 with reference values of the first comparison-reference-value generating device 30 and the second comparison-reference-value generating device 32 (set lower than the first reference value). The first comparator 29 and the second comparator 31 output the comparison results as the output signal waveform S and the output signal waveform T.

The short-circuit detecting device 28 checks the voltage value at the machining gap at the fall of the discharge detection output. The short-circuit detecting device 28 compares the voltage value with the short-circuit reference voltage (preferably 15 volts or less) and outputs the short-circuit detection signal (U in FIG. 5). The short-circuit reference voltage differs depending on the electrode material and the like, as does the arc discharge voltage. Therefore, there is no standard value for all cases. The short-circuit reference voltage is, for example, set to 15 volts or less and preferably 10 volts or less, when the electrode 2 is formed of graphite material and the workpiece is steel.

The machining voltage level detecting device 40 detects the voltage flowing through the current detection resistor R3 in FIG. 2 and outputs a voltage waveform K opposite to the discharge voltage. The comparator 41 compares the reference voltage Vc with the output signal from the machining voltage level detecting device 40. When judged that the output VCP voltage from the machining voltage level detecting device 40 is larger than the reference voltage Vc, the discharge pulse is judged to be the abnormal discharge pulse and the output signal L is output. The reference voltage Vc differs depending on the electrode material and the like. Therefore, there is no standard value. However, when the graphite electrode machines steel, the reference voltage Vc is set to be the reference voltage value equivalent to the machining voltage of 20 volts to 25 volts. Alternatively, the reference voltage Vc is set to a voltage value equivalent to the machining voltage that is 25% to 30% of the interelectrode open voltage (for example, 80 volts) of the main power supply of the power supply circuit.

The no-load time detecting device 42 detects the time from when the voltage is applied to the machining gap between the electrode 2 and the workpiece 3 until the discharge voltage and the discharge current at the machining gap is detected. The no-load time detecting device 42 compares the detected time with the reference time t. When the detected time is less that the reference time t, the discharge is judged to be the quick discharge. The output signal indicated in M is output. Here, the reference time t differs depending on the electrode material and the like. Therefore, there is no standard value. However, when the graphite electrode machines steel, the reference time t is set to be three microseconds or less. When the level of the output signal from the comparator 41 is "H" and the output signal is output while the level of the output signal from the no-load time detecting device 42 is "H" and the output signal is output, the "H" level signal is output. In other words, the quick discharge is generated in the Machining gap between the electrode 2 and the workpiece 3. When the abnormal discharge in which the machining voltage level is low is generated, the discharge pulse is judged to be the abnormal discharge pulse. The output signal indicated in N is output.

The pulse control device 43 acquires the identification outputs of the discharge pulse from the first comparator 29, the second comparator 31, the comparator 41, and the logic circuit 89. The pulse control device 43 also acquires the identification outputs classified into two types from the short-circuit detecting device 28. The two types of identification outputs indicate whether the short-circuited state is present for each pulse.

When the level of the output signal from the second comparator 31 is "H" and the output signal is output as indicated in T when the level of the output signal from the short-circuit detecting device 28 is "L" (non-short-circuit discharge pulse) as indicated in U, the discharge pulse is judged to be the abnormal discharge pulse based on the high-frequency component. The pulse off time is switched to Toff+ΔToff2. When the level of the output signal from the discharge detecting device 23 is "H" as indicated in P (during discharge pulse) or when the level of the output signal from the comparator 41 is "H" and the output signal is output as indicated in L, the discharge pulse is judged to be the abnormal discharge pulse based on the machining voltage level. The pulse width of the discharge voltage and the current are cut off. Furthermore, when the level of the output signal from the logic circuit 89 is "H" and the output signal is output as indicated in N, the discharge pulse is judged to be the abnormal discharge pulse. The pulse off time is switched to Toff+ΔToff1 (O2 in FIG. 5). When judged to be the non-short circuit normal discharge pulse, the pulse off time is returned to a setting value prior to change. As described above, the discharge state is judged from the high-frequency component, the discharge voltage level, and a no-load application time, in addition to whether the short-circuited state is present. The discharge pulse is optimally controlled for each discharge pulse.

Figure 6:
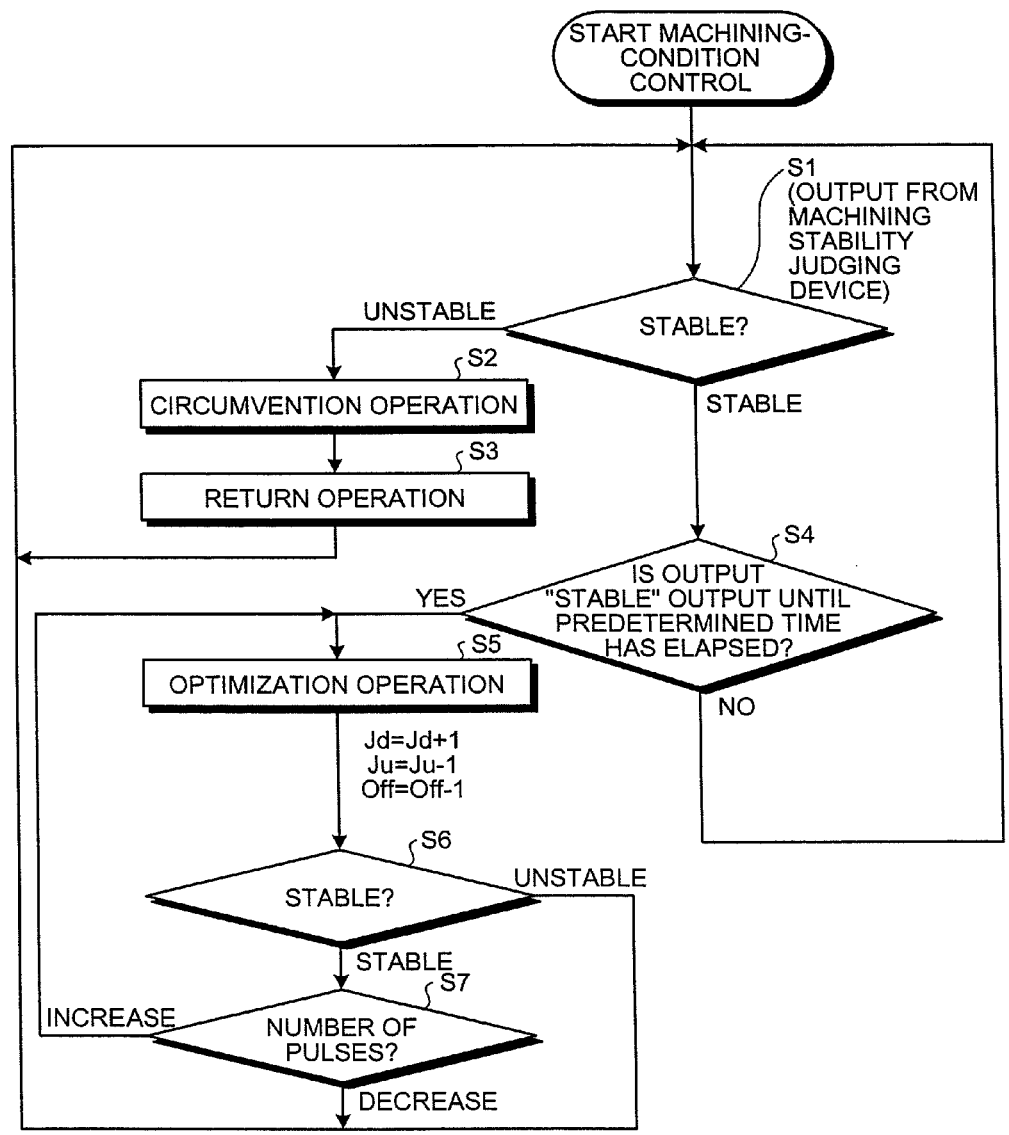
FIG. 6 is a flowchart of the operation of a machining-condition control device shown in FIG. 4.

FIG. 6 is a flowchart of the operation of the machining-condition control device 48 shown in FIG. 4. The operation of the machining-condition control device 48 is described with reference to FIG. 6. The machining stability judging device 47 outputs a signal indicating "stable" or "unstable" at each set period (for example, a sampling time of 0.25 seconds). When the pulse off time is controlled, whether the machining state is "stable" or "unstable" can be judged by a way in which the pulse off time is extended. In FIG. 5, for example, when control is performed so that the pulse off time is ΔToff1=Toff and ΔToff2=Toff, the pulse off time is (2+1+2+1), when the pulse off time Toff serves as a baseline and is 1. Therefore, the average pulse off time is (2+1+2+1)/4=1.5. In this example, the cutting-off of the discharge pulse is not included in a calculation of the average pulse off time. The machining stability judging device 47 judges the value. For example, when the value of the average pulse off time is equal to or more than 1.6, the machining stability judging device 47 judges the machining state to be "unstable". When the value of the average pulse off time is less than 1.6, the machining stability judging device 47 judges the machining state to be "stable" (step S1).

When the machining stability judging device 47 judges the machining state to be "unstable", the machining-condition control device 48 performs a circumvention operation (step S2). For example, the set machining conditions (such as pulse off time) are significantly circumvented. Subsequently, when the machining stability judging device 47 judges the machining state to be "stable", the machining-condition control device 48 performs a return operation to return the setting of the machining conditions to the original setting before the circumvention operation is performed (step S3).

When the machining stability judging device 47 judges the machining state to be "stable" and an output indicating "stable" is output until a set predetermined time (for example, 400 0.25-second sampling times) has elapsed (step S4), the machining-condition control device 48 performs an optimization operation to optimize the set machining conditions (such as jump-down time, jump-up distance, and pulse off time) to enhance machining efficiency (step S5). The optimization operation is sequentially performed from, for example, the jump-down time (Jd=Jd+1 notch) to the jump-up distance (Ju=Ju−1 notch) to the pulse off time (Off=Off−1 notch). When the machining stability judging device 47 judges the machining state to be "stable" during a period (for example, 24 seconds) set after the changes are made to the machining condition (step S6), the machining-condition control device 48 judges whether the number of normal discharge pulses counted by the good/bad pulse counter is equal to or more than a predetermined, coefficient (for example, 1.03 times). The machining-condition control device 48 judges that the normal discharge pulses have increased when the number of normal discharge pulses is equal to or more than the predetermined coefficient and continues the optimization operation (step S7).

Figure 7:
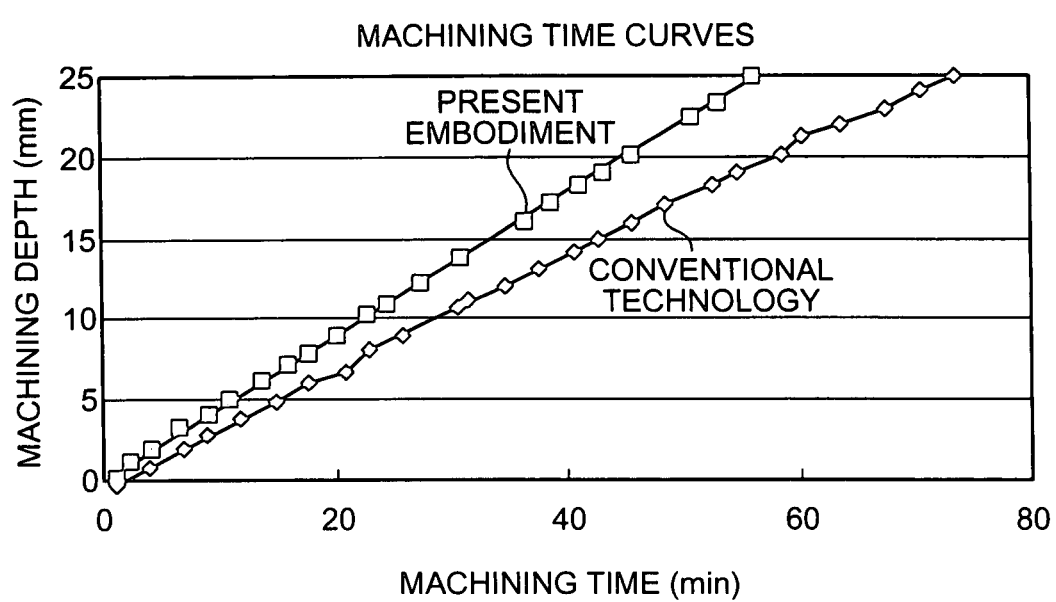
FIG. 7 is a graph of machining time curves showing a comparison between machining performance of an electrical discharge machining apparatus using the power-supply control device according to the present embodiment and that using a conventional one.

Next, a machining performance example using the power-supply control device for electrical discharge machining apparatus according to the present embodiment is described. FIG. 7 is a graph of machining time curves showing a comparison between machining performance of the electrical discharge machining apparatus using the power-supply control device according to the present embodiment and that using a conventional one. Machining is performed on a steel workpiece with a Φ30 millimeter graphite electrode through liquid treatment without jet flow under machining conditions that a peak current value is 55 amperes, the pulse width is 384 microseconds, the pulse off time is 115 microseconds, the jump-down time is 500 microseconds, the jump-up distance is 1.4 millimeters, and a machining depth is 25 millimeters. It is clear that, compared to the conventional electrical discharge machining, the electrical discharge machining according to the present embodiment is performed to a predetermined depth within a shorter period of time. The power-supply control device for electrical discharge machining apparatus according to the present embodiment optimally controls the discharge pulses for each discharge pulse. Therefore, the number of normal discharge pulses can be increased. The "unstable" machining state can be reduced by less average pulse off time. Therefore, the circumvention operation performed to temporarily circumvent the machining conditions (pulse off time) can be significantly reduced. The machining conditions can be set by the operation to optimize the machining conditions so that the machining speed is at maximum. As a result, the machining efficiency can be enhanced.

According to the present embodiment, discharge pulses and pulse off time are controlled immediately after abnormal discharge pulses are classified and identified; however, discharge pulses and pulse off time can be controlled when the count of classified and identified output signals reaches a predetermined value. Instead of pulse off-time control, control can be performed in which a desired amount of voltage pulses are subtracted from voltage pulses applied to the machining gap. Moreover, other than or in addition to pulse off-time control, machining conditions such as jump-down time and jump-up distance can be controlled.

According to the present embodiment, the machining state is judged to be "stable" or "unstable" based on the average pulse off time during a predetermined period. However, the machining state can be judged to be "stable" or "unstable" based on classified and identified abnormal discharge pulses or the number of abnormal discharge pulses.

Industrial Applicability

The power-supply control device for electrical discharge machining apparatus of the present invention is suitably used to control discharge pulses supplied to an electrical discharge machining apparatus that machines a workpiece by generating pulse discharges in a machining gap between a machining electrode and the workpiece facing each other. In particular, the power-supply control device for electrical discharge machining apparatus of the present invention is suitable for an electrical discharge machining apparatus in which an arc-voltage drop easily occurs as a result of abnormal arc discharge.

The invention claimed is:

1. A power-supply control device that controls discharge pulses supplied to an electrical discharge machining apparatus that machines a workpiece by generating pulse discharge in a machining gap between a machining electrode and the workpiece, the power-supply control device comprising:
a voltage level detecting unit that detects a voltage level of discharge voltage at the machining gap;
a no-load time detecting unit that detects delay time of discharge of the discharge voltage;
a voltage level comparing unit that compares the detected voltage level with a reference voltage level;
a pulse control unit that controls pulse off time, the pulse off time being an interval between discharge pulses supplied to the electric discharge machining apparatus, based on a comparison result obtained by the voltage level comparing unit and the detected delay time of discharge of the discharge voltage;
a machining-condition control unit that changes a machining condition to increase machining efficiency in stable machining based on output of the pulse control unit;
an average off-time calculating unit that calculates average pulse off time based on output of the pulse control unit; and
a machining stability judging unit that judges a machining state using the average pulse off time as an index, wherein
the machining-condition control unit changes the machining condition based on a judgment result obtained by the machining stability judging unit.

2. The power-supply control device according to claim 1, wherein the voltage level comparing unit sets the reference voltage level to 25% to 30% of interelectrode open voltage of a main power supply.

3. The power-supply control device according to claim 1, further comprising a pulse counting unit that counts number of normal discharge pulses, wherein
the machining-condition control unit changes the machining condition to increase normal discharge pulses based on output of the pulse counting unit.

4. The power-supply control device according to claim 1, wherein the machining stability judging unit judges the machining state to be unstable when the average pulse off time exceeds a predetermined value, and judges the machining state to be stable when the average pulse off time is equal to or less than the predetermined value.

5. A power-supply control device that controls discharge pulses supplied to an electrical discharge machining apparatus that machines a workpiece by generating pulse discharge in a machining gap between a machining electrode and the workpiece, the power-supply control device comprising:
a high-frequency component detecting unit that detects a high-frequency component of discharge voltage at the machining gap;
a voltage level detecting unit that detects a voltage level of the discharge voltage;
a no-load time detecting unit that detects delay time of discharge of the discharge voltage;
a high-frequency component comparing unit that compares the detected high-frequency component with a reference high-frequency component to obtain a first comparison result;

a voltage level comparing unit that compares the detected voltage level with a reference voltage level to obtain a second comparison result; and a pulse control unit that controls pulse off time, the pulse off time being an interval between discharge pulses supplied to the electrical discharge machining apparatus, based on the first comparison result and the detected delay time of discharge of the discharge voltage, and cuts off a discharge pulse based on the second comparison result.

6. The power-supply control device according to claim 5, wherein the pulse control unit cuts off the discharge pulse when the detected voltage level is equal to or less than the reference voltage level.

7. The power-supply control device according to claim 5, wherein the voltage level comparing unit sets the reference voltage level to 25% to 30% of interelectrode open voltage of a main power supply.

8. The power-supply control device according to claim 5, further comprising a machining-condition control unit that changes a machining condition to increase machining efficiency in stable machining based on output of the pulse control unit.

9. The power-supply control device according to claim 8, further comprising a pulse counting unit that counts number of normal discharge pulses, wherein
the machining-condition control unit changes the machining condition to increase normal discharge pulses based on output of the pulse counting unit.

10. The power-supply control device according to claim 8, further comprising:
an average off-time calculating unit that calculates average pulse off time based on output of the pulse control unit; and a machining stability judging unit that judges a machining state using the average pulse off time as an index, wherein
the machining-condition control unit changes the machining condition based on a judgment result obtained by the machining stability judging unit.

11. The power-supply control device according to claim 10, wherein the machining stability judging unit judges the machining state to be unstable when the average pulse off time exceeds a predetermined value, and judges the machining state to be stable when the average pulse off time is equal to or less than the predetermined value.

* * * * *

UNITED STATES PATENT AND TRADEMARK OFFICE
CERTIFICATE OF CORRECTION

PATENT NO. : 8,420,973 B2
APPLICATION NO. : 11/884000
DATED : April 16, 2013
INVENTOR(S) : Ukai et al.

It is certified that error appears in the above-identified patent and that said Letters Patent is hereby corrected as shown below:

On the Title Page

Item (86), PCT No.:

delete

"PCT/JP2006/020968"

and insert

--PCT/JP2006/320968--

Signed and Sealed this
Twenty-second Day of October, 2013

Teresa Stanek Rea
*Deputy Director of the United States Patent and Trademark Office*